F. L. EAGER.
TROLLEY WHEEL.
APPLICATION FILED DEC. 2, 1908.
1,119,939. Patented Dec. 8, 1914.
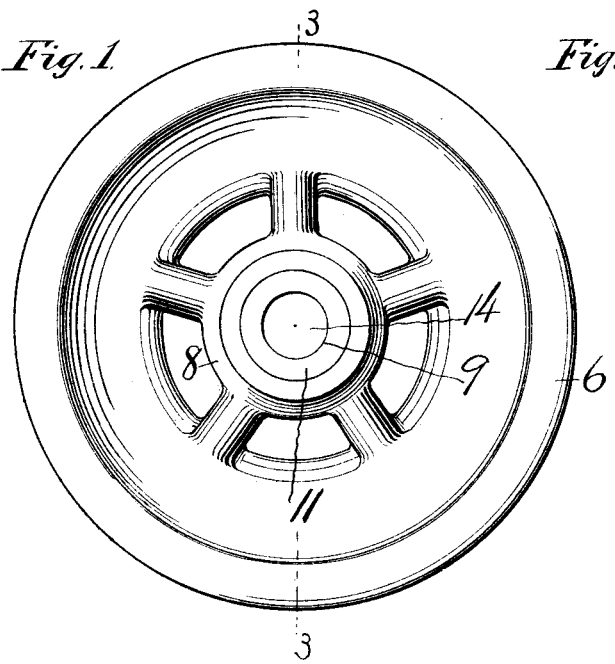
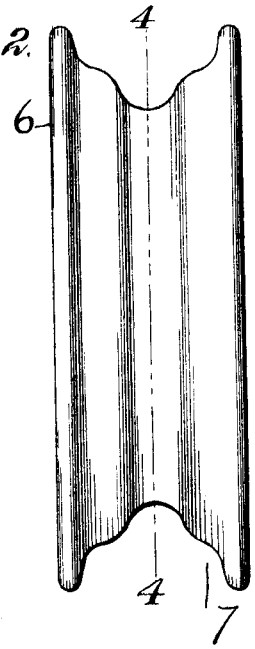
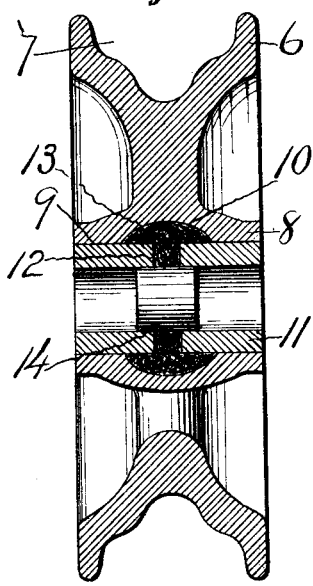
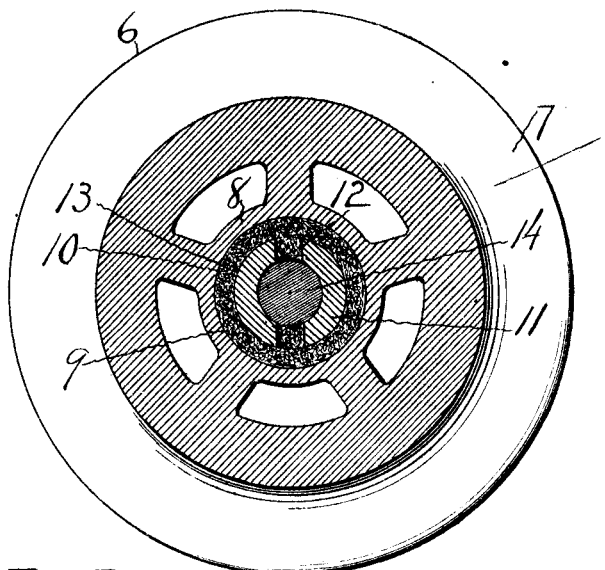
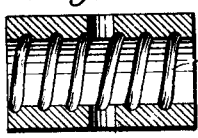
Witnesses:
F. H. Elliott
C. F. [illegible]
Inventor
Frank L. Eager,
By Arthur B. Jenkins
Attorney.
THE NORRIS PETERS CO., PHOTO-LITHO., WASHINGTON, D. C.

UNITED STATES PATENT OFFICE.

FRANK L. EAGER, OF WATERBURY, CONNECTICUT.

TROLLEY-WHEEL.

1,119,939.        Specification of Letters Patent.        Patented Dec. 8, 1914.

Application filed December 2, 1908. Serial No. 465,635.

*To all whom it may concern:*

Be it known that I, FRANK L. EAGER, a citizen of the United States, and a resident of Waterbury, in the county of New Haven and State of Connecticut, have invented a new Improvement in Trolley-Wheels, of which the following is a specification.

My invention relates to the class of devices enumerated herein, and the object of the invention is to provide a device of this class having novel features of advantage and utility.

One form of device embodying the invention and in the use of which the objects sought may be attained is illustrated in the accompanying drawings, in which—

Figure 1 is a view in side elevation of a trolley wheel embodying my invention. Fig. 2 is an edge view of the same. Fig. 3 is a view in section through the same on plane denoted by dotted line 3—3 of Fig. 1. Fig. 4 is a view in section through the wheel on plane denoted by dotted line 4—4 of Fig. 2. Fig. 5 is a detail view in central lengthwise section through a bushing embodying a modified form of construction.

The invention forming the subject-matter of this application is of especial advantage in connection with that class of comparatively short lived movable devices known as trolley wheels, and for that reason such has been selected for the purpose of illustration and description herein. It will, however, be understood that the invention is not limited in its use to devices of this special character, but may be applied with equal advantage to other devices of the same general kind.

A trolley wheel, owing to the peculiar conditions of its use, becomes rapidly destroyed or worn out, an element of no small importance in the matter of this wear and rapid deterioration being lack of means for properly lubricating the bearing of the wheel, which, however, has heretofore seemed unavoidable owing to the peculiar conditions incident to the use of such devices. Under the most favorable conditions a trolley wheel will run a car but a comparatively short distance, even being worn out, as during a sleet or ice storm, in a single round trip of say ten or a dozen miles. On account of its particularly short life it becomes essential, in order to avoid unnecessary cost, that all the wear possible shall be obtained from each wheel. This necessitates in by far the greater majority of cases the storing of wheels at various points if any lubricant, however slight, is employed, and a change of the wheel practically while the car is running, that is, during a momentary stop, or the carrying on the cars of wheels without lubricant. It will thus readily be seen that the ordinary method of lubricating wheels with a liquid agent cannot be resorted to, not only because time does not permit, but also for the reason that such a lubricant would soon become displaced by the action of centrifugal force owing to the great rapidity of rotation of the wheel. A semi-solid or plastic lubricant if applied in the ordinary manner cannot be maintained in the wheels under a majority of the conditions existing with respect thereto and before they are placed for use, for the reason that under the conditions above set out they are of necessity exposed to such degrees of temperature as to cause the lubricant to soften and run out of the wheel before it can be used, which result would effectually prevent carrying of wheels upon cars.

By my invention I have devised a trolley wheel or similar article having sufficient lubricating means to enable the wheel to be run until worn out, thus prolonging the life of the wheel, and which means enables the lubricant to be incorporated as a component part of the wheel structure, and which will remain a part of such structure not only under all the conditions to which the wheel may be subjected before it is put into actual use, but during such use, and it will be consumed or worn in use the same as any integral part of the wheel, outlasting other parts thereof and thus maintaining full lubrication of the wheel until it must be discarded. Such a device is shown in the accompanying drawings, in which—

The numeral 6 indicates the rim of a trolley wheel having a groove 7 and a hub 8 through which a spindle (not shown) for supporting the wheel and upon which it rotates, extends. These parts may be of any suitable material and of any form or shape desired. An opening 9 is formed through said hub, and within this opening is provided means for containing a lubricant. In the preferred form of construction and as shown herein this means includes a groove 10 forming a recess extending around the wall of the opening, this groove being of a depth to contain a sufficient quantity of lubricant for the purpose required. A bushing 11 fits tightly within the opening 9, which bushing forms a wall for the recess or chamber for the lubricant. An opening or openings 12 extending through the bushing into this chamber 10 affords means for conveying the lubricant from the recess or chamber to the parts required to be lubricated. This chamber or recess 10 contains a lubricant 13 which may be of any suitable composition, preferably of a more or less solid form and of such nature that it will readily soften and run under ordinary conditions of use. In order to maintain this lubricant as a component part of the wheel structure I provide means for initially retaining the lubricant in its recess, thus constituting it a component part of the wheel and in a manner not to add to the size or material weight of the wheel, and which retainer may be removed without other operation than that required to place the wheel on its spindle. In the preferred form of device for effecting this result a retainer 14 is employed, which may be of cork or any suitable material placed within the bushing 11 to close the opening 12, this retainer being of a size to properly effect the purpose required.

It will be noted that the lubricant is thus initially maintained by the retainer as a component part of the wheel as an article of manufacture and until such wheel is placed in position upon its supporting spindle, the latter thereafter or finally effecting the result of maintaining the lubricant as a component part of such wheel. The mere operation of placing the wheel upon the spindle will displace the retainer.

In the form of device shown in Fig. 5 the bushing is in general form the same as hereinbefore described with the exception that spirally formed grooves 15 may be provided upon its inner surface.

While I have shown and described herein a preferred form of device for effecting the results stated, this construction may be departed from to a greater or lesser extent without avoiding the invention, and I do not therefore limit myself to the precise form of structure herein shown and described.

While I have shown and described herein a bushing formed of a single piece with openings for the admission of lubricant to the spindle, I do not limit myself to such construction, as this bushing may be otherwise shaped to partially form the lubricant chamber and yet permit access of the lubricant to the central opening through the bushing.

I claim—

1. A trolley wheel including a hub forming a part of said wheel and having a round opening for a spindle extending therethrough, said wheel having a lubricant recess located at one side of the opening through the hub, and a passage extending from said recess in a radial direction into said opening between its mouths, and a round impervious plug inserted in said hub opening across the mouth of said passage, thereby closing the latter.

2. A trolley wheel including a hub having an opening for a spindle, a lubricant recess and a passage extending between said opening and recess, and an impervious seal for said passage resting across the mouth thereof.

3. A trolley wheel including a hub having an opening for a spindle, a lubricant recess and a passage extending between said opening and recess, said passage being located within the interior of the hub, and an impervious seal for said passage closely fitting the interior of the hub and extending across the mouth of said passage to close it.

4. As a new article of manufacture, a trolley wheel having a hub with an opening for a spindle, a lubricant recess and a passage between said opening and recess, a lubricant located within said recess and forming a component part of the manufactured article, and impervious means for sealing the mouth of said passage into said opening.

5. As a new article of manufacture, a trolley wheel having a hub with an opening for a spindle, a lubricant recess and passages extending between said recess and opening within the hub at substantially its lengthwise center, a lubricant located within said recess and forming a component part of the manufactured article, and impervious means for sealing said passages into the opening in the hub.

6. A trolley wheel including a hub having an opening for a spindle, a lubricant recess within the body of the hub and a passage leading from said recess into said opening between the ends of the latter, and a single impervious plug positioned in said opening and lying across said passage to prevent the outflow of lubricant from said recess into said opening.

FRANK L. EAGER.

Witnesses:
ARTHUR B. JENKINS,
LENA E. BERKOVITCH.